United States Patent [19]

Strolle et al.

[11] 4,415,928

[45] Nov. 15, 1983

[54] CALCULATION OF RADIAL COORDINATES OF POLAR-COORDINATE RASTER SCAN

[75] Inventors: Christopher H. Strolle, Philadelphia, Pa.; Terrence R. Smith, Clementon; Glenn A. Reitmeier, Trenton, both of N.J.

[73] Assignee: RCA Corporation, New York, N.Y.

[21] Appl. No.: 298,092

[22] Filed: Aug. 31, 1981

[30] Foreign Application Priority Data

Jan. 26, 1981 [GB] United Kingdom ............ 8102281

[51] Int. Cl.³ .................... H04N 5/02; H04N 5/14; G09G 1/16
[52] U.S. Cl. .................... 358/140; 358/160; 340/727; 364/731
[58] Field of Search ............ 358/112, 140, 160; 364/515, 521, 731, 742, 752; 365/94; 340/727; 343/5 SC; 382/46

[56] References Cited

U.S. PATENT DOCUMENTS

| | | | |
|---|---|---|---|
| 3,836,812 | 9/1974 | Bennett | 315/18 |
| 3,917,935 | 11/1975 | Lazecki | 364/730 |
| 3,947,667 | 3/1976 | Parker | 364/170 |
| 4,002,827 | 1/1977 | Nevin et al. | 343/5 SC |
| 4,065,770 | 12/1977 | Berry | 343/5 |
| 4,106,021 | 8/1978 | Katagi | 343/5 SC |
| 4,149,252 | 4/1979 | Miller, Jr. | 364/456 |
| 4,220,969 | 9/1980 | Nitadori | 358/140 |
| 4,275,415 | 6/1981 | Engle | 358/140 |

OTHER PUBLICATIONS

Hemel, "Making Small ROM's Do Math Quickly, Cheaply and Easily," *Electronics*, May 11, 1970, pp. 104–111.

*Primary Examiner*—John C. Martin
*Attorney, Agent, or Firm*—Joseph S. Tripoli; Robert L. Troike; Allen L. Limberg

[57] ABSTRACT

The calculation of $r^2 = x^2 + y^2$, where x and y are the Cartesian coordinates of a raster-scanned space, is carried forward by accumulation of $2x+1$ and $2y+1$ terms. A read-only memory can then be used for table look-up of r, the radial coordinate of raster scan in polar coordinates.

21 Claims, 10 Drawing Figures

CALCULATION OF RADIAL COORDINATES OF POLAR-COORDINATE RASTER SCAN

The invention relates to the generation of polar-coordinate descriptions of television display rasters and, more particularly, to the generation of the radial coordinates of such descriptions.

The invention is useful, for example, in a television system where a display image is stored in memory addressed by column and by row in respective ones of the radial and angular coordinates of a polar-coordinate system description of display image space. To extract the information stored in such a display memory, the memory is addressed during its reading with a stream of polar coordinates descriptive of a phantom raster scan. This stream of polar coordinates is developed by scan conversion from the stream of Cartesian coordinates descriptive of display raster scan, one coordinate having been developed by counting the video samples in each line scan of the display, and the other coordinate having been developed by counting the number of lines in each field or frame of the display. The scan conversion can also involve a rotation of the phantom raster coordinate system respective to the display raster coordinate system. To avoid the need for a buffer memory addressed by column and by row in Cartesian coordinates and located following the display memory addressed in polar coordinates, it is necessary to generate the polar coordinates used for addressing the display memory at video sampling rate.

It is desirable, insofar as possible, to avoid the need for digital multiplication at these high data rates. Such digital multiplication can be done using emitter-coupled logic (ECL) or transistor-transistor-logic (TTL), but multipliers for multiplying two binary numbers each with an appreciable number of bits are costly. Furthermore, the process of multiplication at super-video rates undesirably involves considerable consumption of power and generation of heat.

The requirement for generating polar coordinate descriptions of raster scan at video sampling rates, while avoiding the use of digital multipliers as much as possible, becomes particularly onerous where the memory addresses are to be generated with greater resolution than is used for actual display memory addresses, with the additional resolution being used to govern two-dimensional spatial interpolation between addressable locations in the display memory. Interpolation is desirable to do since it reduces visibility on the display screen of so-called "rastering effects" arising from the spatial quantizing of information in the digital display system.

A stream of $r^2$ values, where r is the radial coordinate of a raster scan, is generated in accordance with the present invention from the x and y Cartesian coordinates describing that raster scan by accumulating $2x+1$ and $2y+1$. These $r^2$ coordinates can be used to generate circular line graphics on a raster-scanned display screen or as keying signal for opening circular windows in a raster-scanned video signal for insertion of other display information. In preferred embodiments of the invention, insofar as the generation of polar-coordinate descriptions of phantom-raster scan is concerned, the $r^2$ values obtained by the accumulation technique are applied as inputs to a read-only memory (ROM) which serves as a look-up table to find r. This arrangement is particularly advantageous in reducing the amount of ROM to generate r at video sampling rates in only an annular region, as is all that would be needed for addressing a polar-coordinate-addressed display ROM storing an annular graphic image such as a clockface or a circular instrumention dial.

Figure 1:
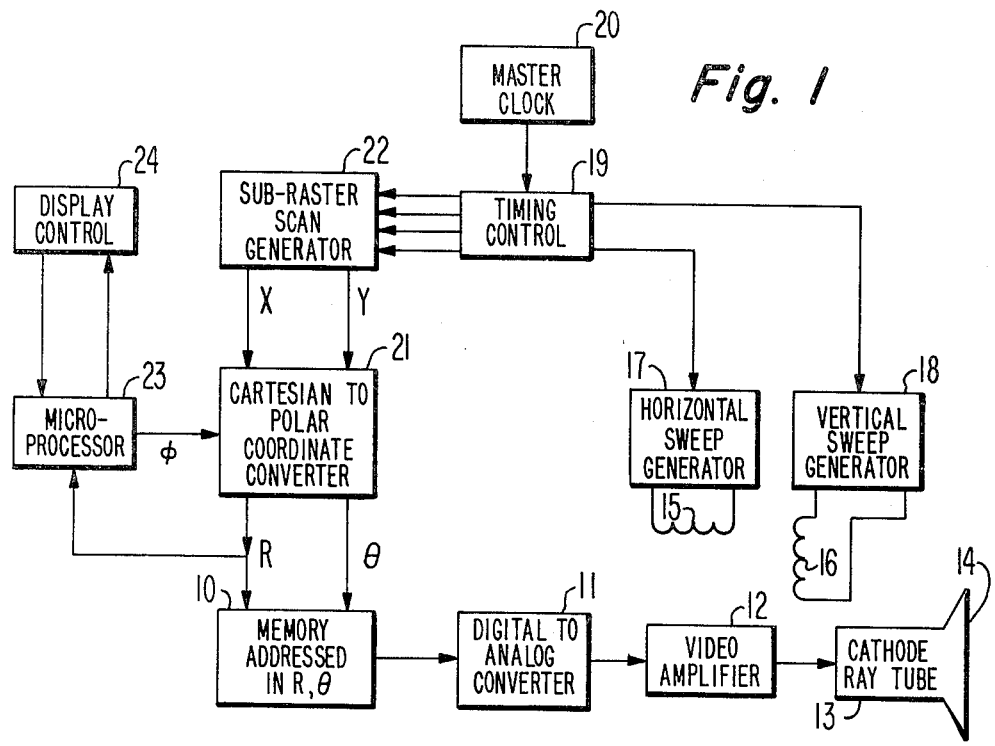
FIG. 1 is a general block schematic diagram of a television display system for displaying an image taken from memory and rotated through a programmable angle in which apparatus the invention finds use.

In FIG. 1, display memory 10 stores information read out at video rates to the input of digital-to-analog converter (DAC) 11 to be converted to video for application to a video amplifier 12, the output of which drives the electron gun of a cathode ray tube (CRT) 13. CRT 13 has a screen 14 raster-scanned by the electron beam emanating from its electron gun. The raster-scanning is typically accomplished using horizontal and vertical deflection coils 15 and 16 supplied sawtooth currents from horizontal and vertical sweep generators 17 and 18, respectively. It is customary to use resonant circuits including the deflection coils in these generators and to synchronize the sweeps with horizontal and vertical synchronizing pulses supplied by timing control circuitry 19. Circuitry 19 generally includes frequency dividing circuitry for generating these synchronizing pulses at rates subharmonic to master clock signals provided from a master clock 20, which customarily comprises a crystal oscillator that operates at the pixel scan rate or a multiple therof. ("Pixel" is short for "picture element".)

Memory 10 is addressed during its read-out by radial and angular coordinates r and $\theta$, respectively, supplied as output from a scan converter 21 responsive to x and y coordinates supplied to it as input from a scan generator 22. Scan generator 22 generates a sub-raster—i.e., a raster scanning of x and y addresses which may or may not be co-extensive with the raster scanning of the display screen by electron beam. These x and y coordinates are generated by scan generator 22 at pixel scan rate during each line scan of CRT 13 screen 14 in the trace direction, as timed from timing control circuitry 19. Scan converter 21 is programmable as to the degree of rotation (expressed as angle $\phi$) of the image to be read out of display memory 10. This angle $\phi$ is added to the angular $\psi$ coordinates descriptive of unrotated image to obtain the angular $\phi$ coordinates descriptive of rotated graphic image. That is, in the system being described $\tan^{-1}(y/x)$ defines $\psi$, rather than $\theta$, with $\theta$ being defined as equalling $\psi$ plus the angle $\phi$ by which the image is rotated between memory 10 and its display on screen 14 of CRT 13. The angle $\phi$ may, for example, be calculated by a microprocessor 23, responsive to data received or interchanged with display control circuitry 24. The display control circuitry 24 might, for example, comprise the gyroscopic compass, synchros and synchro-to-digital converters in a horizontal situation indicator system for aircraft cockpit use. Microprocessor 23 may also use radial coordinate r output from scan converter 21 in its calculations where concentric images are to be rotated in differing degrees.

This specification assumes that the positive direction for x coordinates extends from left to right and that the positive direction for y coordinates extends from top to bottom, defining a coordinate system where the angle $\psi = \tan^{-1}(y/x)$ increases in clockwise rotation. This differs from customary analytic geometry notation, but is consonant with normal television scanning practice.

Figure 2:
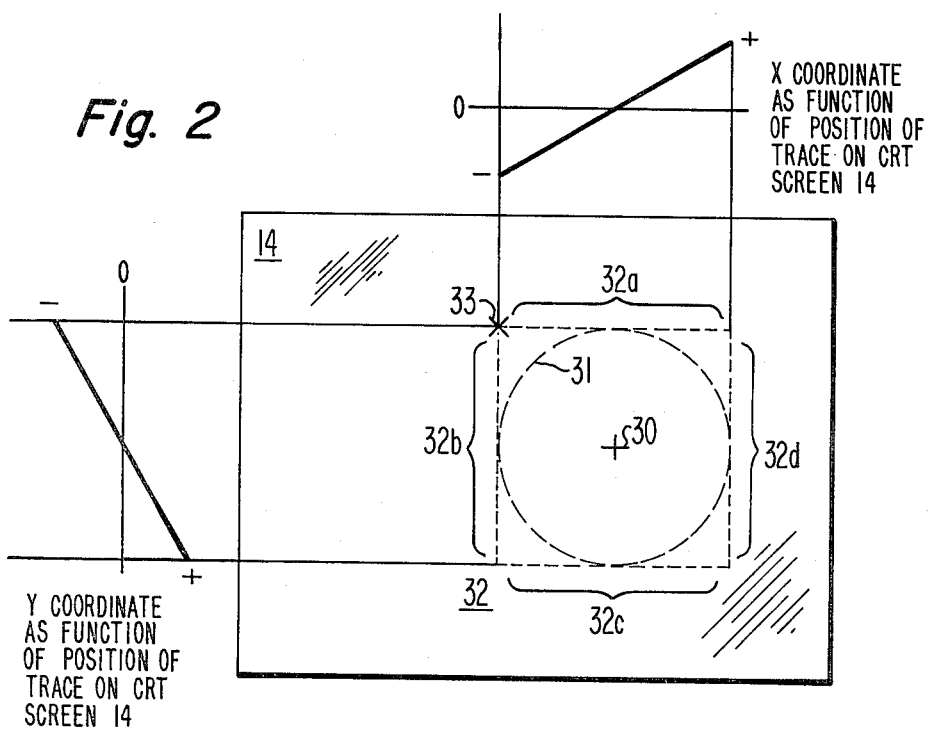
FIG. 2 is a diagram useful in understanding the forms taken by the Cartesian coordinates describing the rotatable image prior to its rotation.

FIG. 2 is useful in understanding how to define the x and y coordinates of electron beam trace position to implement scan conversion. Point 30 is the arbitrarily chosen center of rotation for the image to be retrieved from memory 10. This center of rotation 30 is the center of a dotted-line circle 31 of arbitrary radius within the perimeter of which the image will always repose, whether rotated or not. It is convenient to choose this radius to be $2^n$ pixels, where n is an integer. Circle 31 is inscribed in a square 32 with sides 32a, 32b, 32c, and 32d which defines that portion of the raster-scan to be transformed from x, y coordinates to the r, $\theta$ coordinates used for addressing memory 10.

The scan conversion calculations are considerably simplified by choosing the center of rotation 30 as the origin for the x, y coordinate system. However, the point at which it is best to begin to carry forward the scan conversion process is the first point to be scanned in square 32—i.e. the upper left-hand corner 33, presuming the use of conventional CRT raster-scan with the relatively slow line-by-line scan from top to bottom in the trace direction and with the relatively fast pixel-by-pixel scan from left to right in the trace direction. This facilitates the changing of the rotation of the graphic image taken from memory 10 as it is presented on display screen 14 of CRT 13 without introducing disruption in the image as displayed. The rotation of the image as a Gestalt becomes possible simply by adding a different angle $\phi$ of programmable rotation to the angular coordinate developed by scan converter 21, performing this addition during times between successive raster scannings of the portion of image space occupied by the graphic image stored in memory 10. As noted above, it is desirable to avoid straightforward digital multiplication in the scan conversion process, and the alternative of using some accumulation process processing at pixel-by-pixel rate in conversion of x and at line-by-line rate (where the display is not interlaced) in conversion of y may occur to the digital system designer.

Beginning scan conversion at other than the x, y origin poses a problem of how to establish the initial conditions for accumulation. In part, this problem arises inasmuch as the origin is the only part that is scan-converted without being affected by the angle $\phi$ through which the image is rotated. Another aspect of the problem is that the origin in both coordinate systems is remote from point 33, so at least one of its coordinates tends to have nearly maximum value. Usually accumulation processes are carried forward from zero, however, so that the large numbers are gradually accumulated, this tending towards simplifying the arithmetic to a single addition or so.

Figure 3:
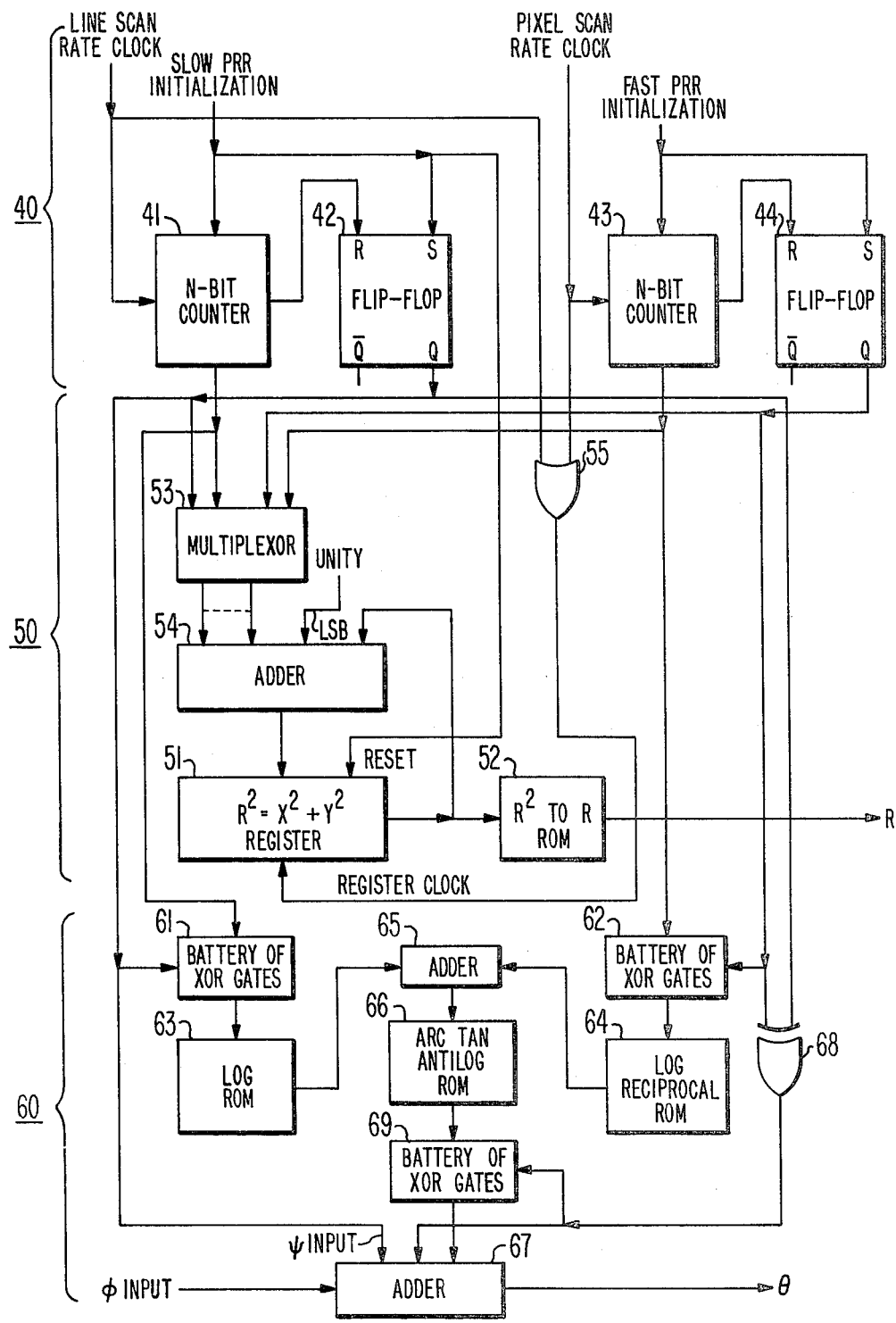
FIG. 3 is a block schematic diagram of scan generator and scan converter circuitry embodying the invention, used for addressing a memory storing information organized according to polar coordinates.

FIG. 3 shows a particular sub-raster scan generator 40 for generating x and y scan coordinates. The rest of the apparatus in the figure is a scan converter for converting these Cartesian coordinates to polar form for addressing memory 10, which is addressed in polar coordinates. E.g., memory 10 is addressed by column in angular coordinates ($\theta$) and by row in radial coordinates (r). It is convenient to have the scan generator generate x and y coordinates in two's complement form.

The y coordinate of scan is generated using an n-bit counter 41 and a set-reset flip-flop 42; their combined outputs provide the y coordinate in two's complement form, its most significant bit being provided by the Q output of flip-flop 42 and its less significant bits by counter 41 output. The output of counter 41 is reset to ZERO and the Q output of flip-flop 42 is set to ONE by a SLOW-PRR INITIALIZATION pulse generated in timing control circuitry 19 at the time when the raster-scanning of the display screen brings the electron beam trace to position 33 (described in connection with FIG. 2). ("PRR" is the abbreviation for "pulse repetition rate.") The count in counter 41 is incremented by a LINE-SCAN-RATE CLOCK pulse furnished to it by timing control circuitry 19 following each time the electron beam trace crosses side 32d of square 32 in FIG. 2, and occurring before the trace crosses side 32b on the ensuing line of display screen raster-scan. When the electron beam scan has crossed side 32d of square 32 on the electron-beam-trace scan line just prior to that which sweeps through center of rotation 30, the n-bit counter 41 will have counted $2^n$ scan lines and have reached full count of $2^n - 1$. The next LINE-SCAN-RATE CLOCK pulse input will cause the counter 41 output to change from n parallel bits each ONE to n parallel bits each "ZERO" and to reset flip-flop 42. When being reset, flip-flop 42 toggles from ONE to ZERO at its Q output; and its Q output remains at ZERO for the remainder of the scanning of square 32.

The x coordinate of scan is generated using a n-bit counter 43 and a set-reset flip-flop 44; their combined outputs provide the x coordinate in two's complement form, its most significant bit being provided by the Q output of flip-flop 44 and its less significant bits, by counter 43 output. The output of counter 43 is reset to ZERO and the Q output of flip-flop 44 is set to ONE by a FAST-PRR INITIALIZATION pulse generated by timing control circuitry 19 at the time when the raster-scanning on the display screen brings the electron beam to any point on side 32b of square 32 (described in connection with FIG. 2). The count in counter 43 is incremented at video rate by a PIXEL-SCAN-RATE CLOCK pulse furnished from timing control circuitry 19. When the electron beam has reached a distance from side 32b one pixel shorter than that center of rotation 30 is from side 32b, the n bit counter 43 will have counted $2^n$ pixels and have reached full count $2^n - 1$. The next PIXEL-SCAN-RATE CLOCK pulse input will cause the counter 43 output to change from n parallel bits each ONE to n parallel bits each ZERO and to set flip-flop 44 with its overflow bit. The Q output from flip-flop 44 toggles from ONE to ZERO and remains at ZERO for the remainder of the scan to side 32d of square 32.

The types of circuitry that can be used in timing control circuitry 19 for generating the LINE-SCAN-RATE CLOCK, SLOW-PRR INITIALIZATION, PIXEL-SCAN-RATE CLOCK and FAST-PRR INITIALIZATION pulses are familiar to the video system designer. The PIXEL-SCAN-RATE CLOCK and LINE-SCAN-RATE CLOCK pulses are normally generated by frequency-dividing counters which count MASTER CLOCK pulses--although it is possible (particularly in systems with monochromatic display) that the master clock 2) supplies output pulses at pixel scan rate, which may be supplied without frequency division to counter 43 as input for counting. The SLOW-PRR INITIALIZATION pulse may be generated using a counter to count electron-beam-trace scan lines since field retrace and then using a digital comparator to compare the output of that counter to a programmed line count for indicating when the edge 32a of square 32 has been reached by the electron beam trace; and the FAST RESET pulse may be generated using a counter to count pixels since line retrace and then using a digital comparator to compare the output of that counter to a programmed pixel count for indicating when the edge 32b of square 32 has been reached by the electron beam trace. These counters are normally extant in the frequency divider circuitry used in the generation of horizontal and vertical synchronizing pulses for the horizontal and vertical sweep generator 17, 18. In the special case where the perimeters of the display screen and of square 32 coincide, the SLOW-PRR and FAST-PRR INITIALIZATION pulses may be provided by the vertical and horizontal synchronization pulses, respectively, with the PIXEL-SCAN-RATE CLOCK and LINE-SCAN-RATE CLOCK pulses being supplied as gated clocks, with clock pulses furnished only during trace and not during retrace. In this special case the counters used in the scan generator may also be employed in the counting used in frequency division of the master clock pulse repetition rate to control the timing of horizontal and vertical synchronization pulses for sweep generators 17 and 18.

In other cases, where the square 32d is entirely within the confines of the screen, gated clocks may be used where clock pulses are provided only as long as the electron beam trace is within square 32. Allowing square 32 to be only partially on screen will require measures to prevent the portion of the display that is supposed to be off-screen—i.e. beyond an edge of the screen—from appearing on screen extending from the opposite edge of screen. This blanking is most straightforwardly carried out by selectively enabling the reading of memory 10 depending on whether the evenness or oddness of the counts in counters 41 and 43 correspond or do not correspond to those of the counts from the frequency dividing counters in timing control circuitry 19 which are used to time horizontal and vertical synchronization pulses. While field interlace is not normally used in digitally generated graphic video displays, where it is used, the LINE-SCAN-RATE CLOCK to counter 41 can comprise pulse doublets, each doublet occurring once per line scan interval to cause counter 41 to increment by two each time it counts rather than by unity. Provision is then also made to apply an additional LINE-SCAN-RATE CLOCK pulse to counter 41 every other interval between field scans, to compensate for the one less line in alternate fields.

Circuitry 50 converts the x and y coordinates to the radial coordinate r of the polar coordinates used for addressing memory 10 supposing it to be of a type addressed in polar coordinates. The following formula is a conventional basic conversion formula used in circuitry 50.

$$r^2 = x^2 + y^2 \tag{1}$$

By a process that will be explained presently $x^2 + y^2$ is accumulated in a $(2n+1)$-bit register 51 to provide an $r^2$ input to a read-only memory (ROM) 52. ROM 52 stores a square-root look-up table and responds to $r^2$ to provide the radial coordinate r.

The accumulation of $x^2$ and $y^2$ is based on the following specific expression of the binomial theorem, where z is the general expression for either variable, x or y.

$$(z+1)^2 = z^2 + 2z + 1 \tag{2}$$

From this one can by the rules of ordinary algebra develop the following relationships.

$$(x+1)^2 + y^2 = (x^2 + y^2) + (2x+1) \tag{3}$$

$$x^2 + (y+1)^2 = (x^2 + y^2) + (2y+1) \tag{4}$$

The initial contents of $r^2 = x^2 + y^2$ register 51 should be twice $2^{2n}$ or $2^{(2n+1)}$—that is, the sum of $x^2$ and $y^2$ associated with point 33. This is arranged by resetting the $(2n+1)$-bit register 51 output responsive to the SLOW-PRR INITIALIZATION pulse to all zeros, which represents an overflow count of $2^{(2n+1)}$.

Thereafter, the two's complement output of register 51 is clocked out and added to the two's complement output of a multiplexor 53 responsive to each REGISTER CLOCK pulse provided from the output of an OR gate 55 responsive to either a LINE-SCAN-RATE or PIXEL-SCAN-RATE CLOCK received at one of the inputs of gate 55, and the two's complement result is used to update the contents of register 51. Multiplexer 53 is arranged to select as its output, during times the register 51 is to be clocked with a REGISTER CLOCK pulse derived from a PIXEL-SCAN-RATE CLOCK pulse, its input corresponding to a $(2x+1)$ term. This term comprises n more significant bits each corresponding to the Q output bit of flip flop 44, n less significant bits corresponding to the n-bit output of counter 43, and a least significant bit which is invariably a ONE. Multiplexor 53 is arranged to select as its output, during times the register 51 is to be clocked with a REGISTER CLOCK pulse derived from a LINE-SCAN-RATE CLOCK pulse, its input corresponding to a $(2y+1)$ term. This term comprises n more significant bits each corresponding to the Q output bit of flip flop 42, n less significant bits corresponding to the n-bit output of counter 41, and a least significant bit which is invariably a ONE.

The n more significant bits of these two's complement terms being all ZERO's is indicative of their being positive. In such instances the n less significant bits correspond to the 2x portion of $(2x+1)$ and to the 2y portion of $(2y+1)$; and the least significant bits being ONE's add unity to 2x and 2y. The n more significant bits in these two's complement terms being all ONE's, on the other hand, is indicative of their being negative. In such instances the remaining bits correspond to the complement of $(2x+1)$ and to the complement of $(2y+1)$—i.e. those terms subtracted from $2^n$.

In the case where the perimeters of square 32 and the display coincide, the multiplexor 53 is controlled by pulses generated during horizontal retrace. Absent the pulses, counter 43 output is selected by multiplexor 53 as its output; otherwise counter 41 output is selected as its output. In other cases the multiplexor 53 can be controlled by the output of a flip-flop, set by alternate overflow bits from counter 43 to direct multiplexor 53 to select counter 41 output as its output, and reset by delayed LINE-SCAN-RATE CLOCK pulse to direct multiplexor 53 to select counter 43 output as its output.

Circuitry 60 converts the x and y coordinates to an unrotated image angular coordinate to be added to a programmable angle $\phi$ of image rotation to generate the rotated-image angular coordinate $\theta$ of the polar coordinates used for addressing memory 10, continuing to suppose it to be of a type addressed in polar coordinates. The most significant bit of $\psi$, indicative of the half-plane the sample point of the unrotated image lies in, is available directly from polarity-bit flip-flop 42 of scan generator 40. The second most significant bit of $\psi$, which together with the most significant bit of $\psi$ indicates the quadrant in which $\psi$ lies, is generated at the output of an exclusive OR gate 68 to which the outputs of flip flops 42 and 44 of scan generator 40 are applied. The less significant bits of $\psi$ are in essence, to be generated as the arc tangent of $|y|/|x|$. The quotient of $|y|/|x|$ requires registers of extreme length to maintain sufficient accuracy in defining angles close to multiples of $\pi/2$, including zero and $\pi/2$, inasmuch as $|y|/|x|$ changes rapidly except around odd multiples of $\pi/4$. A comparison of the range of $|y|/|x|$ values can be achieved, and division can be facilitated, by carrying forward the division process using logarithms.

To generate a good approximation for larger values of $|y|$, the two's complement y output of counter 41 with most significant bit suppressed, is applied as first inputs to a first battery 61 of exclusive-OR gates each receiving the Q output of flip-flop 42 as their second inputs. The outputs of the battery 61 of exclusive-OR gates is the approximation to $|y|$ in ordinary binary numbers. The output from second battery 62 of exclusive OR gates provides a good approximation for larger values of $|x|$ analogously, in response to inputs taken from the output of counter 43 and the Q output of flip-flop 44. Where memory 10 stores information at locations with r coordinates close to the origin r=0, the Q outputs of flip-flops 42 and 44 can be added to the outputs of batteries 61 and 62 of exclusive-OR gates to obtain $|y|$ and $|x|$ exactly.

A ROM 63 responds to the n-parallel-bit output of battery 61 of exclusive-OR gates to supply its logarithm to the base two, and a ROM 64 responds to the n-parallel-bit output of battery 62 of exclusive-OR gates to supply the logarithm to the base two of its reciprocal. These logarithms are summed in adder 65 to develop the logarithm of $|y|/|x|$, applied as input to a ROM 66. ROM 66 supplies the arc tangent of the antilogarithm of its input to generate $\psi = \tan^{-1}(|y|/|x|)$, or its complement, depending on the display quadrant. A battery 69 of exclusive-OR gates responds to the quadrant indication from exclusive-OR gate 68 applied to their first inputs and to ROM 66 output applied to their second inputs to provide the polar coordinate $\psi$ of the unrotated image. $\psi$ is summed in adder 67 with the angle $\phi$ through which the image is to be rotated. This addition generates $\phi$, the polar coordinate in which memory 10 is to be addressed, supposing it to contain the display image information in polar-coordinate organization.

Figure 4:
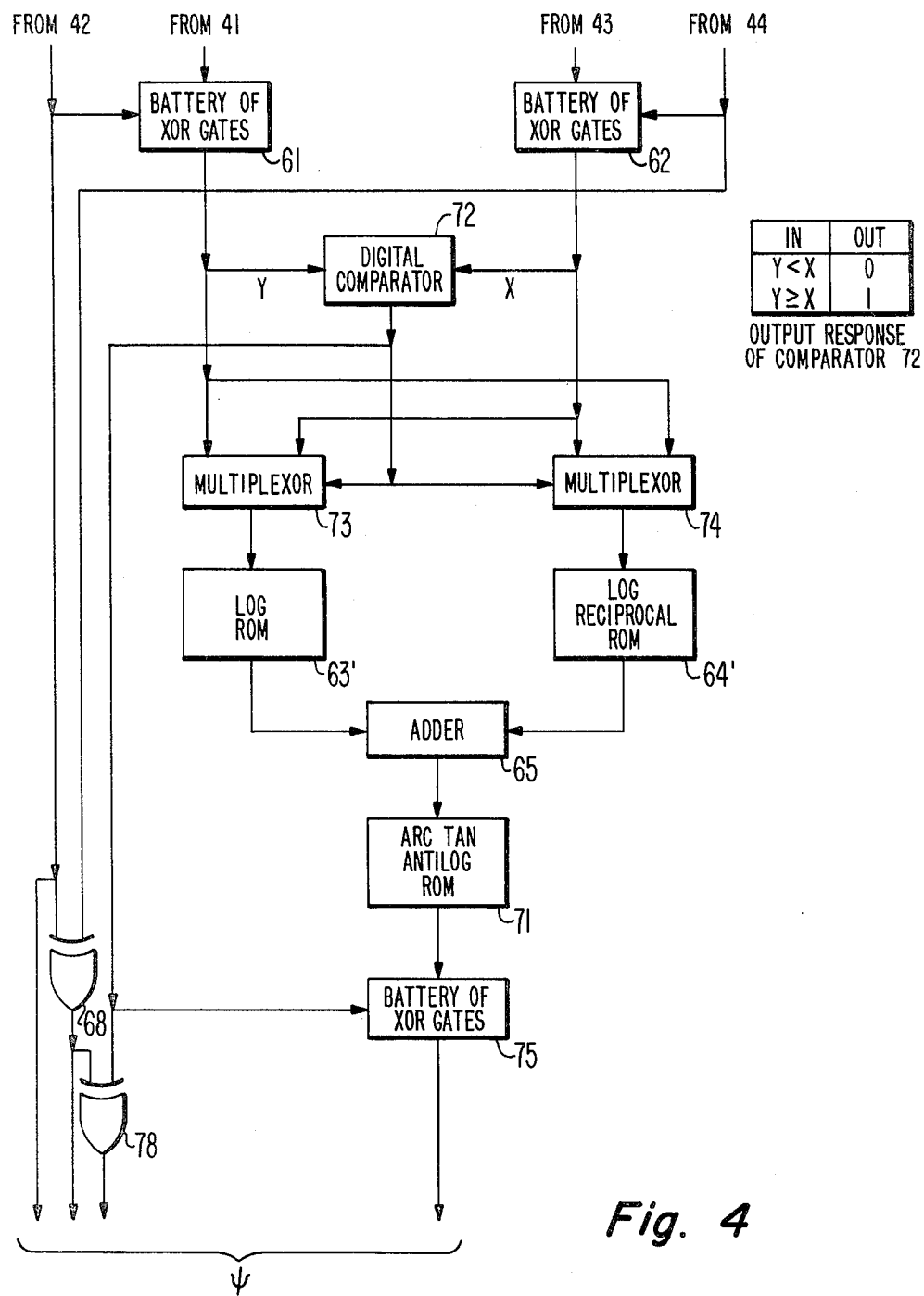
FIG. 4 is a block schematic diagram of a modification that can be made to the FIG. 3 scan converter.

FIG. 4 shows how ROM 66 can be replaced by a ROM 71 which stores $0 \leq \psi \leq (\pi/4)$ rather than $0 \leq \psi \leq (\pi/2)$ taking advantage of the following relationship for $0 \leq \psi \leq \pi/2$.

$$\tan[(\pi/2) - \psi] = = [\tan(\psi)]^{-1}$$

This halves the number of inputs to the ROM for arc tangent look-up.

Digital comparator 72 compares the n-parallel-bit output from battery 61 of exclusive-OR gates to the n-parallel-bit output from battery 62 of exclusive-OR gates to develop an output that is ZERO for the former smaller than the latter and is otherwise a ONE. This output and the output of exclusive-OR gate 68 are applied as inputs to a further exclusive-OR gate 78. The output of gate 78 is used as the thirdmost significant bit of $\psi$ and so reduces by one the number of bits stored at each location in ROM 71 to preserve the accuracy provided by ROM 66.

The output of comparator 72 also is applied as control signal to multiplexors 73 and 74 and as first input to each of a battery 75 of exclusive-OR gates. These exclusive-OR gates receive as second inputs respective bits of the output from ROM 71, reproducing those bits as their outputs when their first inputs are ZERO and complementing those bits as their outputs when their first inputs are ONE. The output of comparator 72 being ZERO directs multiplexors 73 and 74 to apply the outputs of batteries 61 and 62 of exclusive-OR gates to ROM's 63 and 64, respectively; and battery 75 of exclusive-OR gates passes the ROM 71 output without complementing to furnish the less significant bits of $\psi$. The output of comparator 72 being ONE directs multiplexors 73 and 74 to apply the outputs of batteries 61 and 62 of exclusive-OR gates to ROM's 64 and 63, respectively; and battery 75 of exclusive-OR gates complements the ROM 71 output in its output to furnish the less significant bits of $\psi$.

The r and $\theta$ coordinates generated by the scan conversion described above each comprise a "modulus"—i.e., the more significant bits of that coordinate which are used to address the memory—and a "residue"—i.e., the less significant bits of that coordinate which are not used to address the memory. While the residues frac r and frac $\theta$ of these coordinates could be simply disregarded, using them to govern a two-dimensional interpolation between each four closely-grouped adjacent locations in memory permits the practical eradication of step discontinuities in the raster-scanned display tending to arise because the sampled points of the stored image do not conformally map the centers of the display pixels.

The two-dimensional linear interpolation can be done by successively polling each of the four adjacent locations in memory for each pixel scanned in the display raster. Or the memory may be quadruplicated with the image shifted one coordinate step in one direction or the other or both in the three supplementary memories, with the four memories being read in parallel and their outputs summed for each pixel scanned in the display raster. The first of these alternatives involves high video rates of operation. The second of these alternatives requires a fourfold increase in memory size. It was observed that this increase in memory size is just to store replicated data with shifted addresses, which led to a search for a way to retrieve the four pieces of information for the two-dimensional linear interpolation in parallel from a memory not increased in size.

Figure 5:
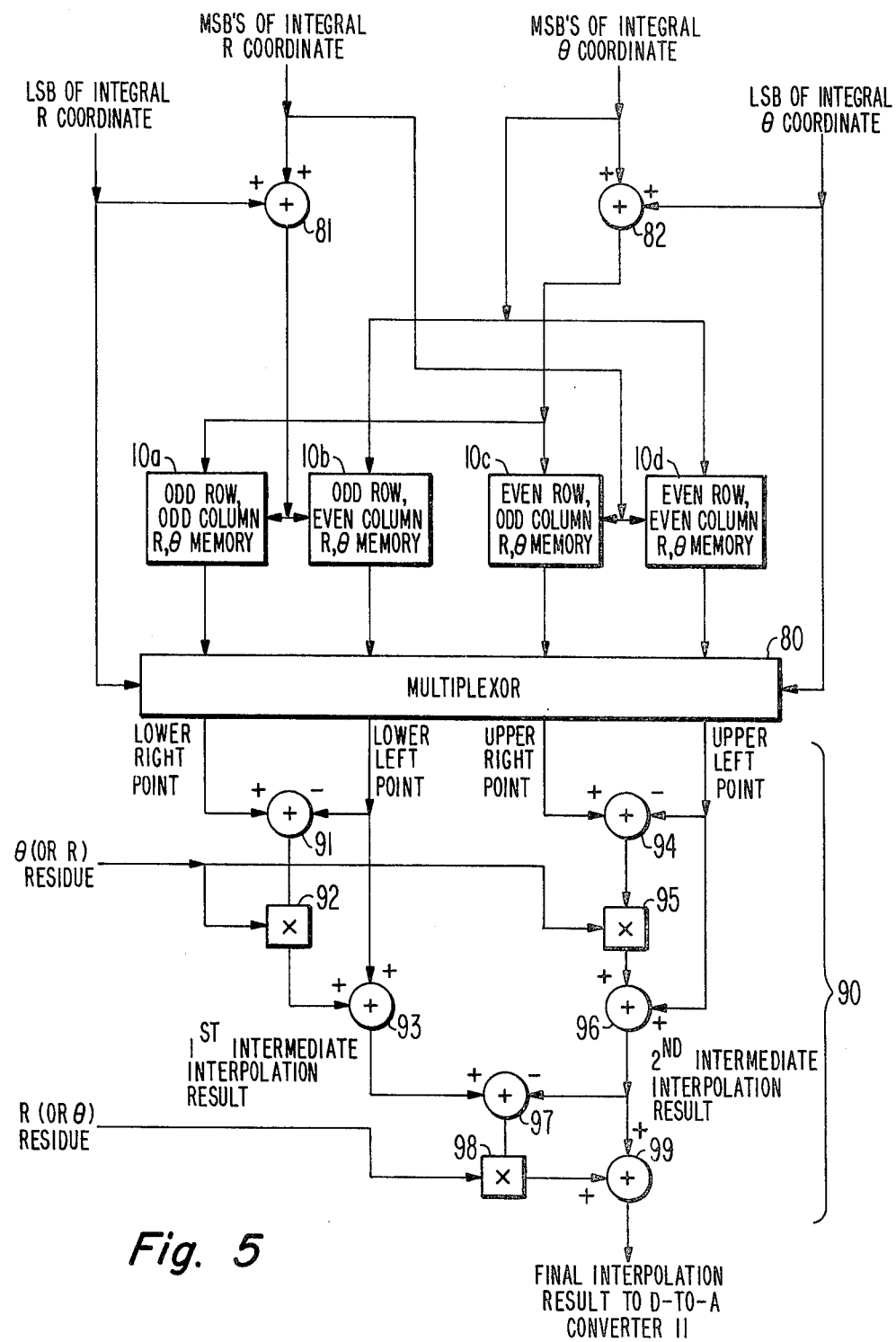
FIG. 5 is a block schematic diagram of a memory system useful in connection with the FIG. 1 apparatus.

FIG. 5 shows the result of that search. Memory 10 is subdivided into four portions 10a, 10b, 10c, and 10d read out in parallel via a multiplexer 80 to simultaneously supply four bits of information in parallel to the two-dimensional linear interpolation circuitry 90. The least significant bits of the integral portions of r and $\theta$ control the multiplexor which accesses the memories depending on whether odd or even column address is at the left in the square arrangement of four adjacent locations in memory under consideration and on whether an odd or even row address is uppermost in the arrangement. For certain square arrangements, such as those where the least significant bits of the integral portions of r and $\theta$ both are ZERO the submemories are addressed similarly in r and $\theta$.

For squares of four adjacent memory locations displaced one row downward, the lowermost row should be at a row address one higher than the uppermost row. This is taken care of by row-addressing submemories 10a and 10b with the output of adder 80, which adds the least significant bit of the integral portion of the r coordinate to the more significant bits of the integral portion of the r coordinate used directly to row-address submemories 10c and 10d.

For squares of four adjacent memory locations displaced one column to the right the rightmost column should be at a column address one higher than the leftmost column. This is taken care of by column-addressing submemories 10a and 10c with the output of adder 82, which adds the least significant bit of the integral portion of the $\theta$ coordinate to the most significant bits of the integral portion of the $\theta$ coordinate used directly to column-address submemories 10b and 10d.

As each pixel is raster-scanned the four adjacent locations in memory addressed at that time supply upper-left, upper-right, lower-left, and lower-right information for two-dimensional linear interpolation in interpolator circuitry 90. This interpolation can be carried out as shown in FIG. 5, for example. The lower-left point trace intensity information is subtracted from the lower-right trace intensity information in combining circuit 91; the difference is multiplied in digital multiplier 92 by the fractional residue of the appropriate coordinate and added back to the lower-left trace intensity information in combining circuit 93 to obtain a first intermediate interpolation result. The upper-right and upper-left trace-intensity information are combined analogously to the lower-right and lower-left trace-intensity information using combining circuit 94, digital multiplexer 95, and combining circuitry 96, to supply a second intermediate interpolation result from the output of combining circuit 96. This second intermediate interpolation result is substracted from the first in combining circuit 97; and the resulting difference is multiplied in digital multiplier 98 by the residue of the other coordinate and added back to the second intermediate interpolation result in combining circuit 99 to obtain the final interpolation result supplied as input to digital-to-analog converter 11.

Figure 6:
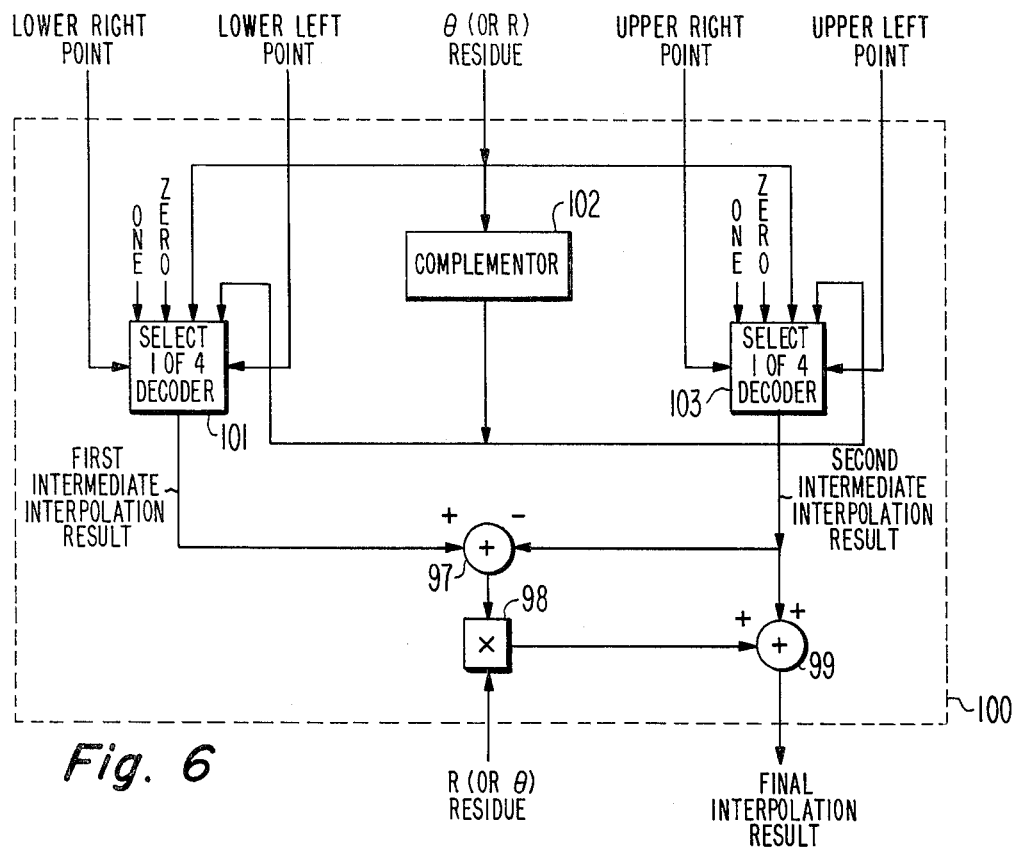
FIG. 6 is a block schematic diagram of a modification which can be made to the FIG. 5 memory system when unshaded line-graphic images are to be stored.

FIG. 6 shows simplified interpolator circuitry 100 which can be used when the trace intensity information stored in memory is two-valued, on or off, ONE or ZERO. The first intermediate interpolation result is the output of a select-one-of-four decoder 101 controlled by the upper-left point and upper-right point as two bits defining four selection conditions. If the upper-left and upper-right points are both ONE, its ONE input is selected by decoder 101 as its output. If the upper-left and upper right points are both ZERO, its ZERO input is selected by decoder 101 as its output. If the upper-left point is ZERO and the upper right point in ONE, the residue of the appropriate coordinate ($\theta$ or r) input of decoder 101 is selected as its output. If the upper-left point is ONE and the upper right point is ZERO on the other hand, the decoder 101 input selected as output is the complement of that residue as generated by complementor (or NOT gate) 102. A select-one-of-four decoder 103 analogously responds to four control states defined by the lower-left and lower-right points to supply as its output the second intermediate interpolation result. The use of decoders 101 and 103 eliminates two costly digital multipliers.

Figure 7:
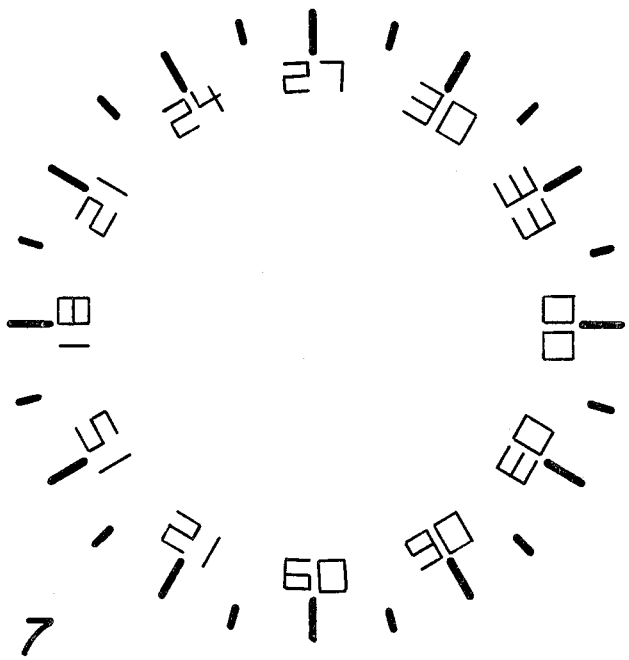
FIG. 7 is a diagram of a horizontal situation indicator (HSI) display that can be presented by the FIG. 1 television display system.

The FIG. 1 television display system is of a type particularly well-suited for the displaying of information containing a high proportion of lines that are circles or arcs of circles and that are radial from origin. An example of such display information is the compass rose pattern shown in FIG. 7, which is rotated on display screen 14 responsive to gyroscopic compass output in a horizontal situation indicator (HSI) for aircraft cockpit use. This annulus of information is placed on display screen 14 so it surrounds the silhouette of an aircraft, nose up, which may be printed on the screen 14 faceplate or may be written onto the screen by electron beam responsive to video signal supplied from additional ROM. Of particular concern here are the design tricks which permit reduction of the amount of ROM required in the television display system for such annular graphic information as the compass rose.

Since the display screen has been described as being $2^{n+1}$ pixels square, the display will contain no information but background matte at radii equal to or in excess of $2^n$ pixels. That is, the corners of the display are only background matte on the display screen and can be keyed in, using as a keying signal the $(2n+1)^{st}$ bit, preceding from binary point in direction of increasing significance, or $r^2$ being ONE to indicate r has exceeded $2^n$, while the read-out from polar-coordinate display ROM is keyed out. Accordingly, this ROM need not have radial address coordinates to accommodate radii larger than $2^n-1$, nor need the $r^2$-to-r ROM accommodate values of $r^2$ larger than $2^{2n}-1$.

Note, too, that the absence of graphic information except background matte within the annular compass rose sets a limit in the minimum value of r for which information need be stored in the display ROM. This allows the suppression of the more significant bits of r in the formation of radial coordinate addresses for the polar-coordinate display ROM, which tends to read the display ROM multiply, as a set of concentric rings surrounding a circle. This tendency towards multiple reading can be suppressed, enabling the reading of the display ROM as a single ring in only the desired range of r coordinates. For example, in the compass rose, presuming its perimeter to fall within $2^n$ radius, the $(n-2)^{nd}$ and $(n-3)^{rd}$ bits of r as well as its $(n-1)^{st}$ bit, can be suppressed since the tick marks of the rose do not extend more than quarter way in from the perimeter of the rose to its center. The polar-coordinate display ROM need be only large enough to accept as partial addressing (n−4) bits of radial coordinate.

The most significant saving in ROM uniquely provided by the invention when the display ROM stores only an annulus of graphic information, comes about because of the restriction of r to values close to $2^n$. This restriction permits a restriction on the values of $r^2$ which allows the $r^2$-to-r ROM to be addressed with significantly fewer bits, saving a large amount of memory for this square-root look-up table. Continuing the previous supposition as to the minimum value of r, this value of r can be specified as 11 followed by a number (n−2) of ZERO bits. The minimum value of $r^2$ corresponding to this minimum r will have a value 1001 followed by 2(n−2) ZERO bits. Values of $r^2$ less than this need not be stored in square-root look-up table ROM.

Each successive value of $r^2$ greater than this square of minimum r will increment from the previous by an increment at least twice minimum r+1, in accordance with the expression of the binomial theorem per equation (2)—i.e. by an increment larger than the quantity 11 followed by a number (n−1) of ZERO bits. So, there can be a truncation of as many as n of the least significant bits of $r^2$ in the input to the $r^2$-to-r square-root table look-up ROM without loss of the ability to distinguish successive values of $r^2$ from each other. Furthermore, for approximate $r^2$ input to the ROM, the square root of the exact $r^2$ known to correspond can be supplied as output; this output will tend to be non-integral. Its integral portion is used for addressing polar-coordinate display memory and its fractional portion is used for governing interpolation between spatially adjacent storage locations in the display ROM.

In the example of the compass rose pattern displayed on a $2^9 \times 2^9$ pixel display screen, the $r^2$ register provides seventeen bits output. The most significant bit of this output is used as a keying signal for background matte and is not forwarded as input to $r^2$-to-r ROM 52. Of the remaining sixteen bits, the five least significant bits are discarded, leaving eleven bits to address ROM 52 and allowing a $2^5$ times reduction in the size of this ROM.

This possibility of thirty-two times reduction of ROM size is not available when one uses a ROM addressed directly in $|x|$ $|y|$ for table lookup of r. This is because there are small values of $|x|$ and $|y|$ which describe locations in the annulus, so the low valued input to ROM cannot be discarded. Consequently there can be no truncation of input to ROM providing table-look up of r from $|x|$ and $|y|$ to reduce the number of bits in this ROM input. The technique is, however, applicable to coordinate systems with $\theta$ as one coordinate and a function of r as the other—e.g. the inverse polar coordinate system with coordinates $r^{-1}$ and $\theta$.

Figure 8:
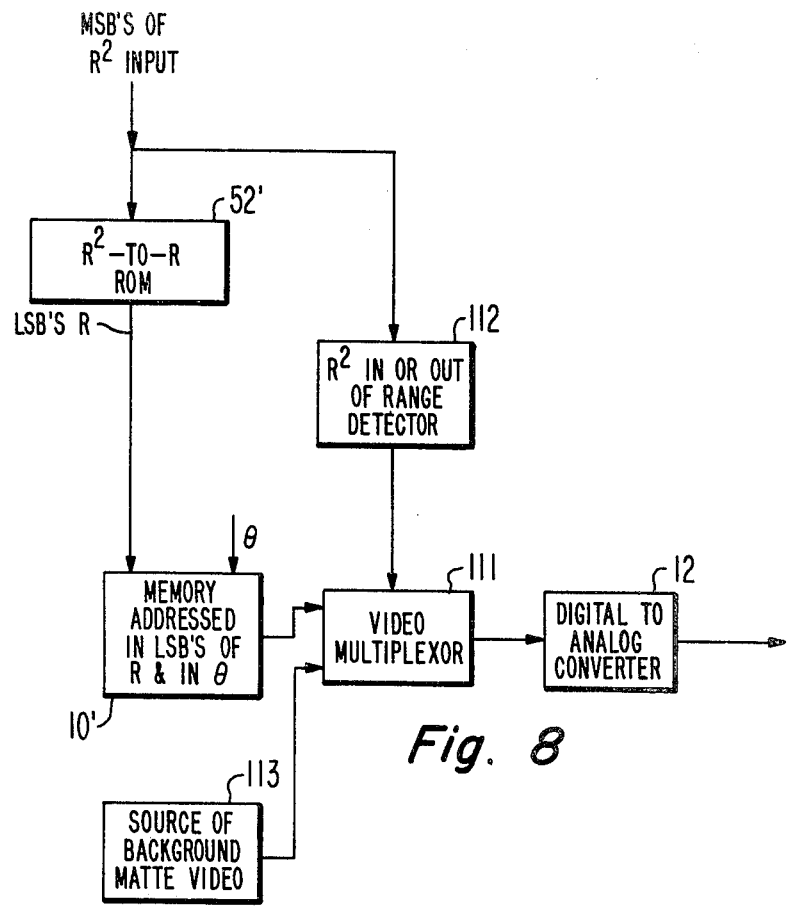
FIG. 8 is a block schematic diagram of a modification that can be made to the FIG. 1 system, in accordance with a further aspect of the invention, for reducing the amount of ROM required for converting $r^2$ to r.

FIG. 8 shows further modifications that can be made to the FIG. 1 display system using scan converter as shown in FIG. 3 to save ROM when the graphic information in polar-coordinate display memory exhibits video-level changes only in an annular region. The polar-coordinate display memory 10 addressed in r and $\theta$ is replaced by display memory 10' addressed in r with its more significant bits suppressed, reducing the required number of address lines in the radial dimension. The suppression of the more significant bits of r in the addressing of ROM 10' allows $r^2$-to-r ROM 52 to be replaced by ROM 52' with two fewer bits in its output, offering further saving on the memory required for square-root table look-up.

In FIG. 8 the output read from ROM 10' is selectively applied to the input of digital-to-analog converter 12 by a video multiplexer (or MUX) 111, rather than being directly and continuously applied to DAC 12 input as output read from ROM 10 is in FIG. 1. MUX 111 responds to a detector 112 indicating $r^2$ to be in a range such that r is in the range for which ROM 10' stores graphic image, to apply read-out from ROM 10' to DAC 12. When detector 112 indicates $r^2$ to be out of that range, MUX 111 responds to forward background matte video from source 113 thereof to the input of DAC 12 instead. Detector 12 output is, then, a keying signal for selecting which of the ROM 10' and source 113 outputs is to be applied to the input of DAC 12.

Determining whether r is in or out of range indirectly, using $r^2$, allows for the omission of the more significant bits of r in ROM 52' output. Alternatively, ROM 52 could be retained, rather than using ROM 52', and detector 112 could be replaced by a detector directly determining whether or not r is in the range for which ROM 10' stores image data.

Consider now the forms detector 112 might take, presuming that it is to supply a ONE as control signal to MUX 111 when it is to select output from ROM 10' to be forwarded to the input of DAC 12, and that it is to supply a ZERO as control signal to MUX 111 when it is to forward video from source 113 instead.

Suppose that the values of r stored in the $r^2$-to-r ROM 52' are for radii smaller than the radius of a boundary circle surrounding the annular region for which ROM 10' stores a description, that this boundary circle has a radius of two raised to an integral power; and that the most significant bit of $r^2$ is ZERO at all points in the display inside the boundary circle and ONE at all points in the display outside the boundary circle. Then detector 112 may take the form of a two-input AND gate, receiving as one of its inputs the response of a logic inverter to the most significant bit of $r^2$. The other of its inputs will be the nextmost significant bit of $r^2$, if only the two most significant bits of $r^2$ are suppressed in addressing ROM 10' or will be the output of an AND gate receiving the nextmost significant bits of $r^2$, if more of the significant bits of r are suppressed in addressing ROM 10'.

Figure 9:
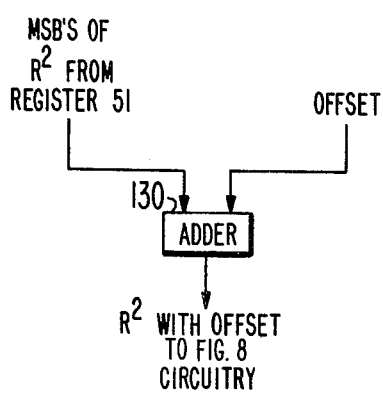
FIG. 9 is a schematic diagram illustrating the form a range detector in the FIG. 8 modification may take.

On the other hand, suppose that the values of r stored in the $r^2$-to-r ROM 52' are for radii larger than the radius of a boundary circle inside the annular region for which ROM 10' stores a description; that this boundary circle has a radius of two raised to an integral power; and that the most of $r^2$ is ZERO at all points in the display inside the boundary circle and ONE at all points in the display outside the boundary circle. Then detector 112 may take the form of a two-input AND gate receiving the most significant bit of $r^2$ as one of its inputs. The other of its inputs will be the response of a logic inverter to the secondmost significant bit or $r^2$, if only the two most significant bits of $r^2$ are suppressed in addressing ROM 10', or will be the output of a NAND gate receiving as its inputs a plurality of the nextmost significant bits of $r^2$, if more of the significant bits of $r^2$ are suppressed in addressing ROM 10'.

Where the annular region addressable in display memory 10' is not proximate to a boundary radius of two raised to an integral power, then, to permit suppression of another more significant bit in the addressing of ROM 52', $r^2$ output from register 51 may be modified as shown in FIG. 9 by adding an offset to it in adder 130, to form an $r^2$ with offset. This is forwarded to the FIG.

8 circuitry, rather than $r^2$ from register 51 being forwarded. The stored values of r in ROM 51' are for $r^2$ before offset is added. Modification of register 51 $r^2$ term by multiplying it by non-integral power of two is also possible, but requires more elaborate circuitry. Such multiplication, if attempted, is best done by scaling in the accumulation processes used to generate $r^2$.

Figure 10:
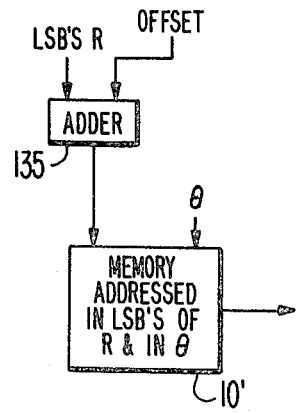
FIG. 10 is a block schematic diagram of other modifications that can be made to the FIG. 1 system, in accordance with still further aspects of the invention.

Offset of the r-coordinate address supplied to display ROM 10' from ROM 52 or 52' may be desirable to facilitate reduction of the number of r-coordinate addresses in ROM 10' for selected—coordinates. This can be done by using an adder 135 to add in the desired offset in r-coordinate as shown in FIG. 10, or by manipulating the bits of the r-coordinate supplied to ROM 40

Where the annular region is a thin enough band, ROM 10' may be replaced by a ROM addressed directly from register 51 output using bits descriptive of $r^2$ and $\theta$, rather than r and $\theta$, with interpolation being conducted using the less significant bits of $r^2$ and $\theta$, which describe fractions of addressable locations. This permits dispensing with the relatively large ROM 52'.

The accumulation of $r^2$ in accordance with the invention can be carried forward in a number of ways essentially equivalent to that described. For example $r^2$ can be accumulated using separate registers to accumulate $x^2$ and $y^2$ and adding their contents to obtain $r^2$. The following claims should be construed bearing this in mind.

What is claimed is:

1. Apparatus for calculating the square of the radial coordinate of polar coordinate raster scan, said apparatus comprising:

means for supplying temporally-parallel streams of x and y orthogonal Cartesian coordinates descriptive of raster scan, the y coordinates enumerating scan lines in each field of raster scan by zero and by negative and positive numbers, and the x coordinates enumerating picture elements in each scan line by zero and by negative and positive numbers, zero x and y coordinates specifying the point in the raster scan with zero radial coordinate;

an output register for storing the square of the radial coordinate of polar coordinate raster scan as it is calculated;

means for initializing the contents of said output register to the square of the radial coordinate of the initial point of said raster scan;

means responsive to each change in x coordinate for doubling that change;

means for thereupon performing a signed addition of the doubled change, unity and the contents of said output register to update the contents of said output register;

means responsive to each change in y coordinate for doubling that change; and means for thereupon performing a signed addition of the doubled change, unity, and the contents of said output register to update the contents of said output register.

2. A raster-scanned television display system including:

means for supplying temporally-parallel streams of x and y orthogonal Cartesian coordinates descriptive of raster scan, the y coordinates enumerating scan lines in each field of raster scan by zero and by negative and positive numbers, and the x coordinates enumerating picture elements in each scan line by zero and by negative and positive numbers, zero x and y coordinates specifying the point in the raster scan with zero radial coordinate;

an output register for storing the square of the radial coordinate of polar coordinate raster scan as it is calculated;

means for initializing the contents of said output register to the square of the radial coordinate of the initial point of said raster scan;

means responsive to each change in x coordinate for doubling that change;

means for thereupon performing a signed addition of the doubled change, unity and the contents of said output register to update the contents of said output register;

means responsive to each change in y coordinate for doubling that change;

means for thereupon performing a signed addition of the doubled change, unity, and the contents of said output register to update the contents of said output register;

a cathode ray tube with a display screen on which a trace appears responsive to an electron beam generated by an electron gun thereof responsive to an input video signal;

sweep generator means for raster-scanning the trace position on said display screen in accordance with said x and y Cartesian coordinates; and means responsive to the square of the radial coordinate reaching a prescribed value to change said input video signal.

3. Apparatus for calculating the radial coordinate of a polar coordinate description of the locus of a scanning point, said apparatus comprising:

means for supplying streams of x and y Cartesian coordinates descriptive of the locus of said scanning point, zero x and y coordinates specifying the point in said locus with zero radial coordinate;

an output register for storing the square of the radial coordinate of the scanning point locus as it is calculated;

means for initializing the contents of said output register to the square of the radial coordinate of the initial point of said scanning point locus;

means responsive to each change in x coordinate for doubling that change;

means for thereupon performing a signed addition to the doubled change, unity and the contents of said output register to update the contents of said output register:

means responsive to each change in y coordinate for doubling that change;

means for thereupon performing a signed addition to the doubled change, unity, and the contents of said output register to update the contents of said output register; and a read-only memory responding to at least a portion of the contents of said output register for supplying from storage said radial coordinate as output signal.

4. Apparatus as set forth in claim 3 with means for applying an input signal to said read-only memory which includes:

means for selecting places in the contents of said output register other than its most significant place and its least significant places for application as input signal to said read-only memory.

5. Apparatus as set forth in claim 3 with means for applying an input signal to said read-only memory including:

means for complementing the places of numbers to provide input signal to said read-only memory; and means for selecting places in the contents of said output register other than its most significant place and its least significant places to provide the numbers to said means for complementing.

6. Apparatus as set forth in claim 3 with means for applying an input signal to said read-only memory including:

an adder having a first input to which an offset number is applied, having a second input to which places in the contents of said output register other than its most significant place and its least significant places are applied, and having an output from which input signal for the read-only memory is provided.

7. Apparatus as set forth in claim 3 with means for applying an input signal to said read-only memory which includes:

an adder having a first input to which an offset number is applied, having a second input to which places in the contents of said output register other than its most significant place and its least significat places are applied, and having an output; and means for complementing each place of the output signal from said adder to provide input signal to said read-only memory.

8. Apparatus as set forth in claim 1 wherein said means for supplying temporally-parallel streams of x and y coordinates includes:

means for supplying those x and y coordinates in two's complement form; and wherein said means for initializing the contents of said output register essentially consists of:

means for entering ciphers in all places of said output register at the beginning corner of raster scan.

9. Apparatus as set forth in claim 8 wherein each means for doubling that change does so by shifting places of that change to next most significant places, allowing additions of unity by said means for performing signed addition by placing unity in the least significant places vacated by shifting places.

10. In combination:

means for supplying a stream of x, y Cartesian coordinates;

means responsive to said stream of x, y Cartesian coordinates for calculating the sums of their squares; and a read-only memory conducted to respond to the sums of their squares greater than a limit value corresponding to a sum of the squares of substantial values of x and y, for supplying a function related to the radial coordinates that are the square roots of those sums.

11. Apparatus for calculating the radial coordinate of polar-coordinate raster scan within an annular region, said apparatus comprising:

means for supplying first and second digital number signals describing orthogonal Cartesian coordinates of raster scan;

means for accumulating successive sums of the squares of said first and second digital number signals;

means for discarding at least one of the most significant places of each of said successive sums and keeping at least the less significant of the remaining places to get a respective truncated signal; and a read-only memory for responding to each of said truncated signals within a specified range for supplying from storage the radial coordinate of polar coordinate raster scan.

12. Apparatus as set forth in claim 11 wherein the truncated signals are applied without modification as input to said read-only memory.

13. Apparatus as set forth in claim 11 wherein an adder adds on offset to said truncated signals to supply input to said read-only memory.

14. Apparatus as set forth in claim 10 or 11 in combination with:

means for generating the angular coordinate of polar coordinate raster scan; and a further memory addressed by the integral portions of the radial coordinate output of said read-only memory and the angular coordinate of polar coordinate raster scan.

15. Apparatus as set forth in claim 14 wherein said further memory is also a read-only memory of a type in which a plurality of spatially adjacent storage locations are read out in parallel responsive to said integral portions of radial and angular coordinates of polar coordinate raster scan; and wherein there is means for interpolating in both radial and angular dimensions between these parallel read-outs.

16. A method for generating the square of the radial coordinate of polar-coordinate raster scan at the output of an accumulator, said method comprising the steps of:

generating temporally-parallel streams of x and y orthogonal Cartesian coordinates descriptive of raster scan, the y coordinates enumerating scan lines in each field of raster scan by zero and by negative and positive numbers, and the x coordinates enumerating points in each scan line by zero and by negative and positive numbers, zero x and y coordinates specifying the point in raster scan with zero radial coordinate;

initializing the contents of said accumulator at the beginning of raster scan with the square of the radial coordinate of the initial point of raster scan;

after each new value of x coordinate is generated, applying twice that value plus unity to the input of said accumulator; and after each new value of y coordinate is generated, applying twice that value plus unity to the input of said accumulator.

17. A method for generating the radial coordinate of polar coordinate scan using an accumulator and a square-root look-up table read-only memory, comprising the steps of generating the square of the radial coordinate of raaster scan using said accumulator according to the method set forth in claim 16; and applying the output of said accumulator to the input of said read-only memory for looking up the radial coordinate.

18. Apparatus as set forth in claim 10 wherein said sums of their squares greater than a limit value are applied without modification as input to said read-only memory.

19. Apparatus as set forth in claim 10 wherein an adder adds an offset to said sums of their squares greater than a limit value to generate the input to said read-only memory.

20. Apparatus for calculating the square of the radial coordinate of the locus of a scanning point, said apparatus comprising:

means for supplying streams of Cartesian coordinates in two's complement form descriptive of successive points of scan in said locus, zero Cartesian coordinates specifying the origin point of said radial coordinates;

an output register for storing the square of the radial coordinate of said locus as it is calculated;

means for initializing the contents of said output register to the square of the radial coordinate of the initial point in said locus;

means responsive to each change in one of said Cartesian coordinates for doubling that change;

means for thereupon performing a signed addition of the doubled change, unity and the contents of said output register to update the contents of said output register.

21. Apparatus for calculating the radial component of the locus of a scanning point, said apparatus comprising in addition to the apparatus set forth in claim 20, the following:

a read-only memory responding to at least a portion of the contents of said output register for supplying from storage said radial coordinate as output signal.

* * * * *